United States Patent [19]
Merritt et al.

[11] Patent Number: 5,768,800
[45] Date of Patent: Jun. 23, 1998

[54] POWDER FEED MECHANISM

[75] Inventors: Christopher R. Merritt, Noblesville; Anthony J. Smotherman, Coatesville; Michael J. Thies, Indianapolis, all of Ind.

[73] Assignee: Matsuo Sangyo Co. Ltd., Osaka, Japan

[21] Appl. No.: 482,478

[22] Filed: Jun. 8, 1995

[51] Int. Cl.$^6$ .................................................... F26B 17/00
[52] U.S. Cl. ........................... 34/576; 34/570; 34/580; 34/586; 34/589
[58] Field of Search ........................ 34/359, 364, 366, 34/370, 576, 580, 581, 585, 586, 589

[56] References Cited

U.S. PATENT DOCUMENTS

| | | | |
|---|---|---|---|
| 2,636,642 | 4/1953 | Gorin | 34/576 |
| 3,341,280 | 9/1967 | Eolkin | 34/370 |
| 3,648,380 | 3/1972 | Guilloud | 34/10 |
| 3,904,375 | 9/1975 | Calbeck | 23/277 |
| 4,591,324 | 5/1986 | Kubota | 425/222 |
| 5,240,185 | 8/1993 | Kaiju et al. | 239/690 |
| 5,323,547 | 6/1994 | Kaiju et al. | 34/580 |
| 5,335,828 | 8/1994 | Kaiju et al. | 222/195 |

FOREIGN PATENT DOCUMENTS 001562542  5/1990  U.S.S.R. ................................ 34/589

Primary Examiner—Henry A. Bennett
Assistant Examiner—Dinnatia Doster
Attorney, Agent, or Firm—Barnes & Thornburg

[57] ABSTRACT

Apparatus for fluidizing a pulverulent material in a stream of fluidizing gas includes a membrane through which the fluidizing gas can flow but the pulverulent material cannot, a first fluidizing gas gallery on a first side of the membrane, a second fluidized pulverulent material gallery on a second side of the membrane, a passageway out of the second gallery for the removal of fluidized pulverulent material therefrom, and apparatus for generating a signal indicative of fluidizing gas pressure inside the second gallery and controlling fluidizing gas pressure in the second gallery in response to the generated signal. The passageway accommodates a conveyor having multiple conveying sections. At least a first of the multiple conveying sections is located adjacent an inlet opening of a housing for the conveyor. The first conveying section is generally coextensive with the inlet opening. A conveyor drive mechanism is selectively engageable with the conveyor.

10 Claims, 6 Drawing Sheets

POWDER FEED MECHANISM

This invention relates to fluidized beds, and particularly to methods and apparatus for conveying fluidized pulverulent materials from the beds. It is disclosed in the context of beds for fluidizing coating powders such as resin powders and porcelain powders but is believed to have other applications as well.

Fluidized beds for dispensing coating powders are known. There are, for example, the systems disclosed in U.S. patents: U.S. Pat. Nos. 5,240,185; 5,323,547; and, 5,335,828. No representation is intended hereby that a thorough search of all material prior art has been conducted or that no more material prior art exists. Nor should any such representation be inferred.

Prior art of which applicants are aware has addressed the problem of providing substantially constant delivery rates of fluidized pulverulent materials, for example, coating material powders. Many of the schemes which have addressed this problem have been characterized by considerable complexity. This complexity is an undesirable trait, particularly in powder coating systems. This is the case because many such systems require the flexibility to change powder coating material characteristics, for example, powder coating material colors, several times during the course of a day's operation. It has been demonstrated to be quite difficult and time-consuming to purge, for example, the fluidized bed of such a powder coating material dispensing system of one powder color prior to the introduction of a new powder color into the bed. And, of course, any pre-change powder color remaining in the fluidized bed and its associated fluidized powder conveying hardware, for example, pumps and the like, has the potential to contaminate the coatings of some one or more articles coated with the post-change powder color.

It is not a solution simply to run a volume of the post-change coating through the coating material dispensing system after a color change. The coating powders are quite expensive, and using the post-change color to purge the pre-change color from the system yields an adulterated color that cannot be recycled. Further, the pre-change color doesn't always purge immediately upon color change. If the powder conveying equipment doesn't handle the fluidized powder quite carefully, the pre-change color can undergo some amount of impact fusion on the conveying equipment and remain on the conveying equipment for some time after the color change has nominally been effected. Only later does the impact fused pre-change color "slug" or slough off the conveying equipment and manifest itself in pre-change color contamination of an otherwise post-change color coated article.

The present invention is intended to address these undesirable characteristics of certain prior art fluidized pulverulent material dispensing systems. The present invention addresses these characteristics, not only by providing a simple conveying system which effectively handles coating powders more gently, but also by providing a total fluidizing system that facilitates effective color change.

According to an aspect of the invention, a fluidized bed includes a semipermeable membrane through which a fluidizing gas can flow but a pulverulent material to be fluidized cannot. First means defines on a first side of the membrane a first fluidizing gas gallery. Second means defines on a second side of the membrane a second fluidized pulverulent material gallery. Third means provides a passageway out of the second gallery for the removal of fluidized pulverulent material from the second gallery. The third means comprises a housing having a first housing portion extending into the second gallery. The first housing portion has a first side region facing the semipermeable membrane and a second side region facing away from the semipermeable membrane. The second side region is provided with an inlet opening for fluidized pulverulent material. A first conveyor is provided in the housing. The first conveyor has multiple conveying sections, at least a first of which is located adjacent the inlet opening. The first conveying section is generally coextensive with the inlet opening. The housing further has a second housing portion for collecting pulverulent material conveyed from the second gallery by actuation of the first conveyor. A second conveyor communicates with the second housing portion for conveying the pulverulent material conveyed thereto to a pulverulent material utilization device.

According to another aspect of the invention, a fluidized bed includes a semipermeable membrane through which a fluidizing gas can flow but a pulverulent material to be fluidized cannot. First means defines on a first side of the membrane a first fluidizing gas gallery. Second means defines on a second side of the membrane a second fluidized pulverulent material gallery. Third means provides a passageway out of the second gallery for the removal of fluidized pulverulent material from the second gallery. The third means comprises a housing having a first housing portion extending into the second gallery. The first housing portion has an inlet opening for fluidized pulverulent material. A first conveyor is provided in the housing. A first conveyor drive mechanism is selectively coupled to the first conveyor. The housing further has a second housing portion for collecting pulverulent material conveyed from the second gallery by actuation of the first conveyor. A second conveyor communicates with the second housing portion for conveying the pulverulent material conveyed thereto to a pulverulent material utilization device.

According to another aspect of the invention, apparatus for fluidizing a pulverulent material in a stream of fluidizing gas comprises a membrane through which the fluidizing gas can flow but the pulverulent material cannot. First means defines on a first side of the membrane a first fluidizing gas gallery. Second means defines on a second side of the membrane a second fluidized pulverulent material gallery. Means provides a passageway out of the second gallery for the removal of fluidized pulverulent material therefrom. A means is provided for generating a signal indicative of fluidizing gas pressure inside the second gallery and controlling fluidizing gas pressure in the second gallery in response to the generated signal.

According to another aspect of the invention, a method for fluidizing a pulverulent material in a stream of fluidizing gas comprises providing a membrane through which the fluidizing gas can flow but the pulverulent material cannot, providing a first fluidizing gas gallery on a first side of the membrane, providing a second fluidized pulverulent material gallery on a second side of the membrane, and providing a passageway out of the second gallery for the removal of fluidized pulverulent material therefrom. A signal indicative of fluidizing gas pressure inside the second gallery is generated and provided to a means for controlling the fluidizing gas pressure inside the second gallery.

The invention may best be understood by referring to the following detailed description of an illustrative embodiment and accompanying drawings. In the drawings.

Figure 1:
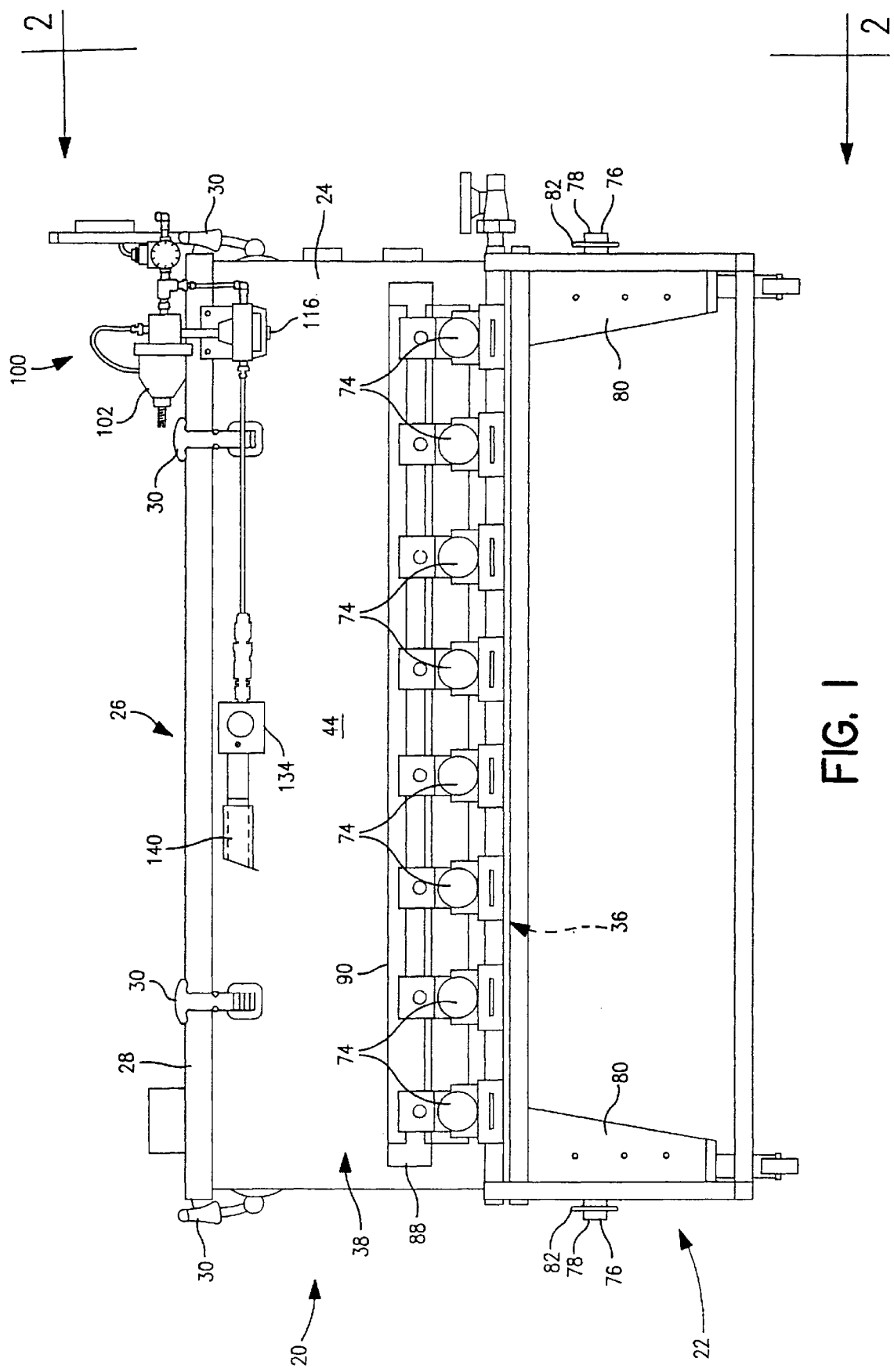
FIG. 1 illustrates a side elevational view of a system constructed according to the present invention.
Figure 2:
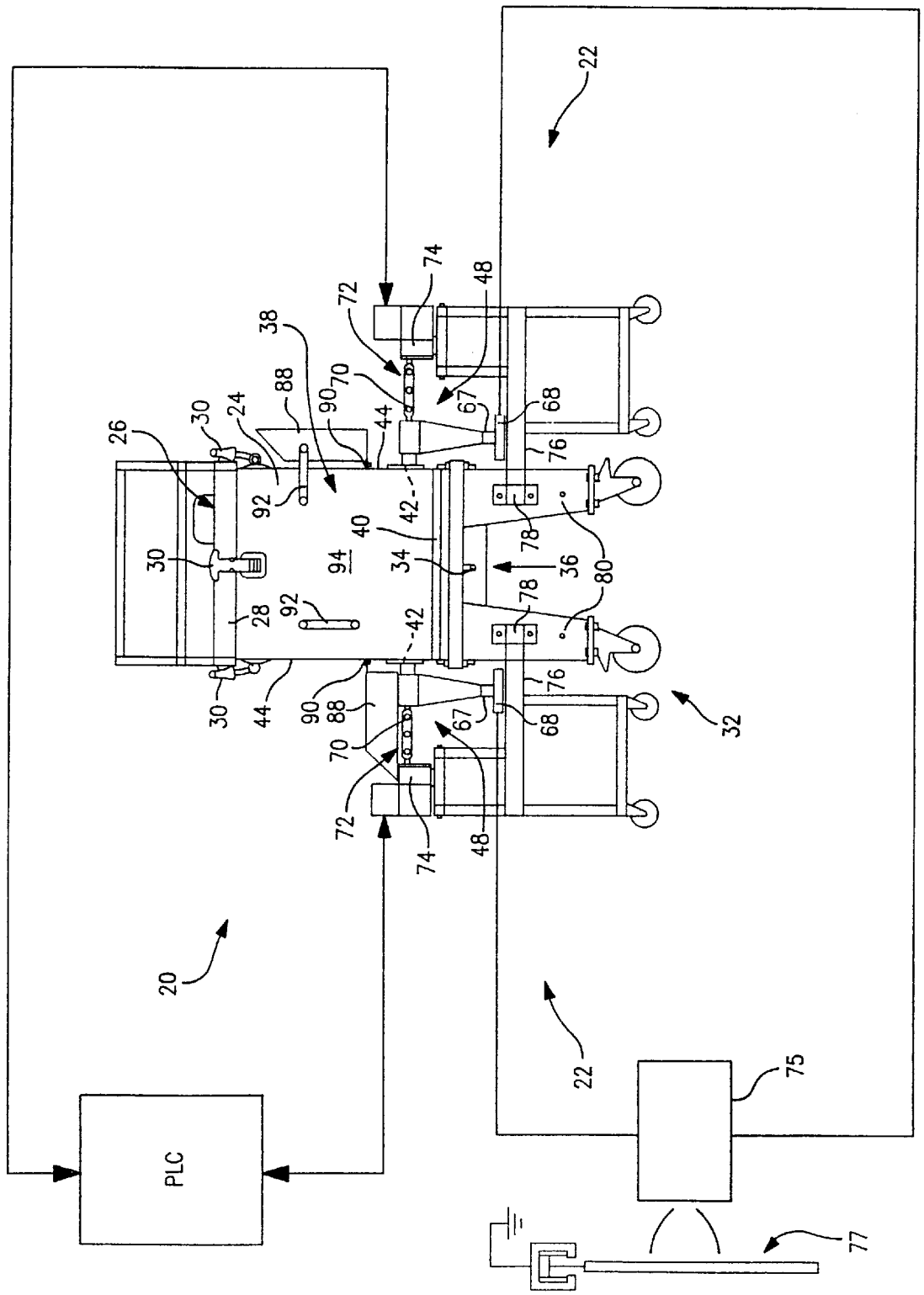
FIG. 2 illustrates an end elevational view of the system illustrated in FIG. 1, taken generally along section lines 2—2 of FIG. 1.

Turning now to FIGS. 1–2, a system constructed according to the present invention comprises a powder hopper 20 and two motor carts 22. The hopper 20 has a rectangular prism-shaped hopper body 24 and a rectangular hopper lid 26 having a perimetral lip 28 which cooperates with the top of the hopper body 24 to seal the hopper 20 closed when cooperating fasteners 30 with which the body 24 and lid 26 are provided are engaged. The hopper body 24 is mounted on a wheeled frame 32 to facilitate movement of the hopper 20. Fluidizing gas, for example, compressed air, entry fittings 34 (FIGS. 2 and 4) are provided at both ends of hopper 20 for connection to a source of fluidizing gas such as factory compressed air.

The hopper 20 is divided into a lower fluidizing gas gallery 36 (FIGS. 2 and 4) and an upper fluidized powder gallery 38 by a semipermeable membrane wall 40 of, for example, VYON porous polyethylene sheet available from Atlas Minerals and Chemicals, Inc., Mertztown, Pa. 19539. Compressed air entry fittings 34 communicate with gallery 36. Membrane 40 permits the passage of the fluidizing gas upwardly therethrough from fluidizing gas gallery 36 but does not permit the passage of powdered coating material downwardly therethrough from the fluidized powder gallery 38. As the compressed air passes upward through the membrane 40, it fluidizes the powder in gallery 38. In the illustrated embodiment eight ports 42 are spaced apart along each of the longer walls 44 of hopper 20. Other numbers of ports 42 can, of course, be provided. Ports 42 communicate with gallery 38. One or more removable cover plates 46 can be attached, for example, by threaded fasteners, to cover these ports 42 when fluidized powder coating is not being withdrawn from hopper 20 through them. However, when fluidized powder coating is to be withdrawn from hopper 20 through (a) port(s) 42, the cover plate(s) 46 associated with that (those) port(s) is (are) removed and a powder conveyor housing 48 (FIGS. 5–7) is attached to each such port 42, for example, by threaded fasteners to the hopper 20 side wall(s) 44. A mounting flange 49 is provided on each conveyor housing 48 for this purpose.

Each powder conveyor housing 48 includes a first portion 50 having a generally right circular cylindrical interior 56 which extends through a respective port 42 and into gallery 38, and a second portion having a generally frustoconical or funnel-shaped interior 52 which lies outside hopper 20. Portion 50 communicates with portion 52 through an opening 54 provided in the sidewall of portion 50 within portion 52. The generally right circular cylindrical interior 56 of portion 50 is coated with a friction-reducing material such as, for example, Teflon S product 954-103, available from E.I. DuPont DeNemours and Company, Inc., Wilmington, Del. 19898, to a thickness of about 0.003" (about 0.08 mm).

Figure 8:
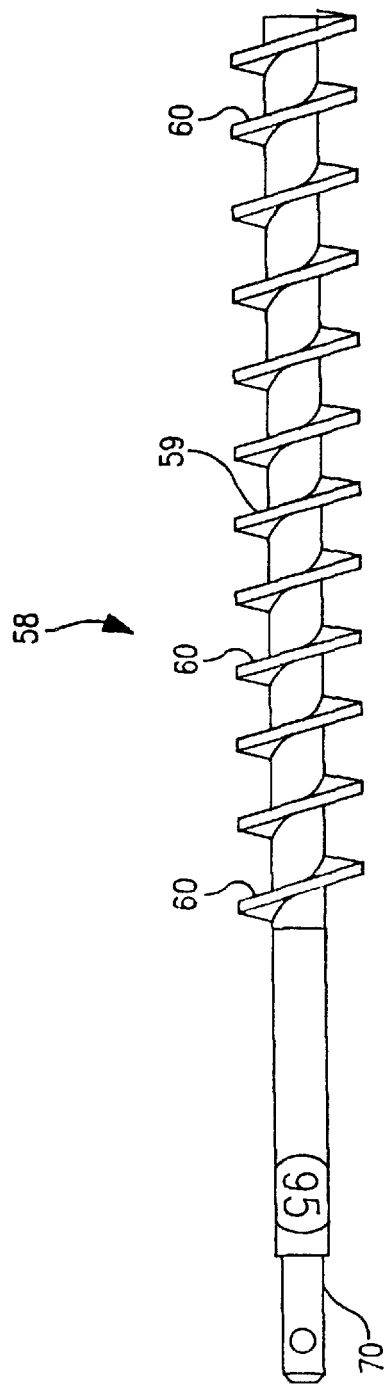
FIG. 8 illustrates a plan view of a detail of the system illustrated in FIGS. 1–4; and, FIG. 9 illustrates a plan view of a detail of the system illustrated in FIGS. 1–4.

A multiple section conveyor 58 (FIG. 8) is inserted into interior 56 to convey fluidized powder from gallery 38 to opening 54. The illustrated conveyor 58 comprises an auger 59. Auger 59 illustratively is also constructed to present a reduced friction surface to the powder being conveyed through housing 48. A suitable material for auger 59 is Nylatron NSB nylon resin available from Cadillac Plastics Inc., Troy, Mich. 48007. Each flight 60 of the auger 59 comprises a conveyor section. Illustratively, the pitch of each flight 60 is about 0.59" (about 15 mm). There are about eleven and a half flights. The diameter of the auger 59 is about 0.95" (about 24 mm). The diameter of interior 56 is about 1" (about 25.4 mm). The flight 60 of auger 59 adjacent opening 54 terminates about ⅛" (about 3.2 mm) upstream from the upstream edge of opening 54.

Interior 56 of first portion 50 is open both at its end 62 inside gallery 38 and at its end 64 adjacent funnel-shaped interior 52. A notch 66 is provided in the upper side of first portion 50. Notch 66 intersects open end 62 and extends away from open end 62 a distance substantially equal to the pitch of the first flight 60 of auger 59. Having notch 66 open in a direction (upwardly) facing away from membrane 40 isolates conveyor 58 somewhat from the forced entry of fluidized powder on the current of powder-bearing air streaming upward from membrane 40. Rather, somewhat more quiescent fluidized powder enters the first flight 60 of auger 59 and is conveyed along the auger 59 to opening 54 for transfer to second portion 52 of housing 48. This results in somewhat more uniform transport of powder through conveyor 58 from gallery 38 to a second conveyor 68 (FIG. 2), such as a conventional powder injector, mounted at the bottom end 67 of each second portion 52. A suitable powder injector is the Model PI3, part 114635, available from GEMA Industrial Powder Systems Division of ITW, 3939 West 56th Street, Indianapolis, Ind. 46254.

The shaft 70 of each auger 59 extends outwardly through the open end 64 of a respective first portion 50. The end of each shaft 70 is coupled by a flexible coupler 72, such as a universal joint, to a respective conveyor 58 drive motor 74. Each drive motor 74 illustratively includes a reducing transmission and a rotation encoder for output of transmission output shaft speed-related information to the PLC. The drive motors 74 are mounted side by side on motor carts 22. Each drive motor 74 powers one conveyor 58 under the control of a programmable logic controller which illustratively is an Allen Bradley SLC 500 series PLC. The PLC provides closed loop control of the motors 74 in accordance with a stored program.

Because the same carts 22 can be selectively coupled to a number of different hoppers 20 containing different types, for example, different colors, of powders, and because different types of powders have different characteristics, it is convenient to store in the PLC the delivery parameters for each different type of powder to be dispensed from a hopper 20 whose conveyors 58 are driven from the motors 74 on carts 22. For example, let it be assumed that powders A and B are to be delivered selectively to a powder dispensing device 75, illustrated diagrammatically. Powder A requires motor 74 speeds C rpm for a delivery rate of D grams of powder per minute to the bottom of each respective housing portion 52. Powder B requires motor 74 speeds E rpm for a delivery rate of F grams of powder per minute to the bottom of each respective housing portion 52. Delivery rates of D grams of powder A per minute to the bottom of housing portion 52 and F grams of powder B per minute to the bottom of housing portion 52 provide suitable coating characteristics of powders A and B, respectively, on articles 77 to be coated by one or the other of powders A and B. When an article is to be coated with powder A, the PLC calls up the powder A process parameter corresponding to C rpm and provides closed loop control of motors 74 to maintain the motor 74 speeds at C rpm. When an article is to be coated with powder B, the PLC calls up the powder B process parameter corresponding to E rpm and provides closed loop control to motors 74 to maintain the motor 74 speeds at E rpm.

Figure 4:
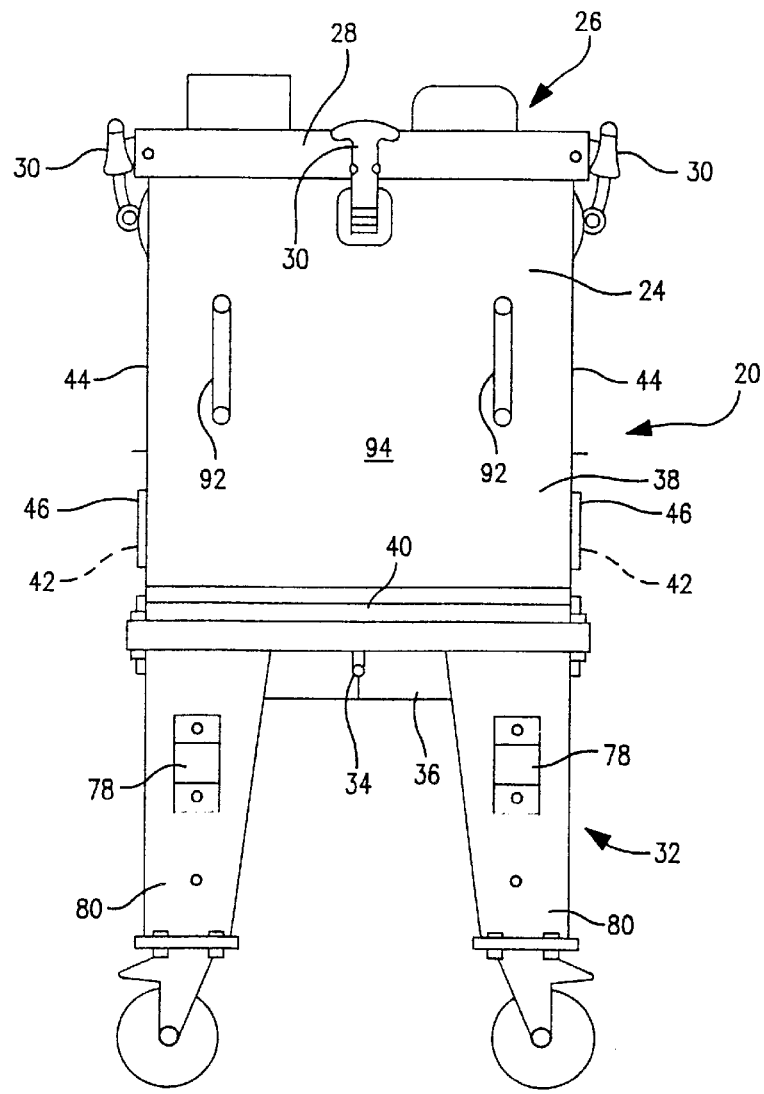
FIG. 4 illustrates an end view of the detail illustrated in FIG. 3, taken generally along section lines 4—4 of FIG. 3.
Figure 3:
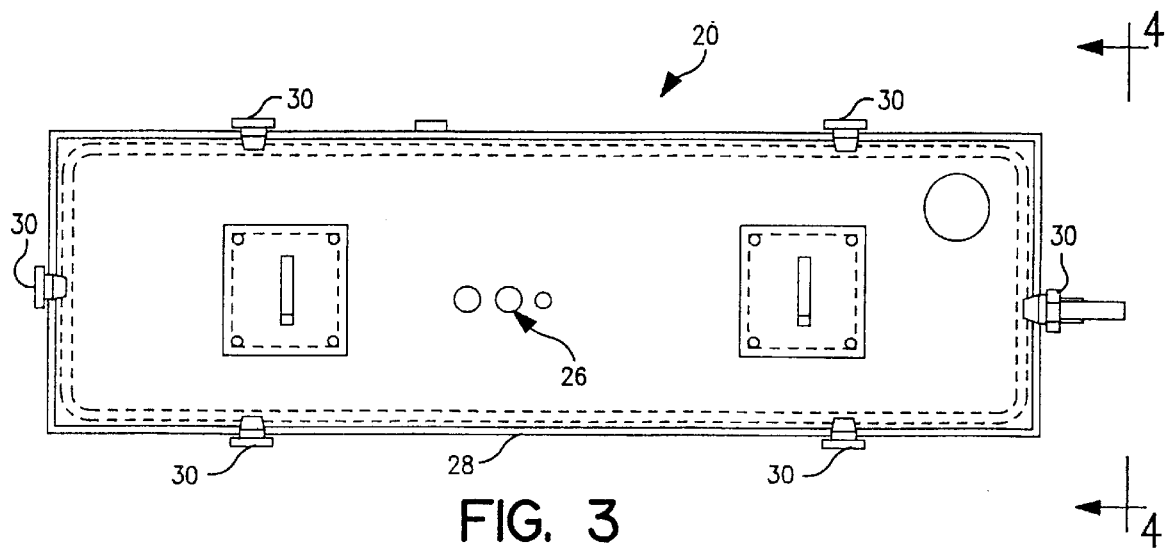
FIG. 3 illustrates a top plan view of a detail of the system illustrated in FIGS. 1–2.
Figure 5:
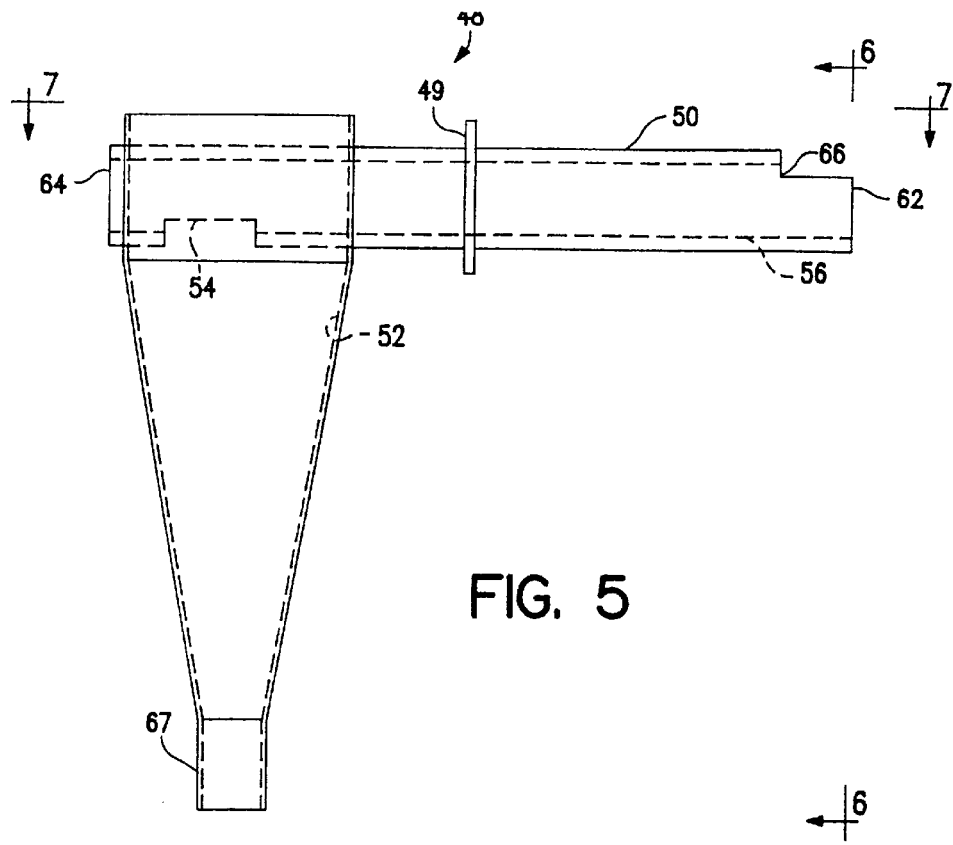
FIG. 5 illustrates a side elevational view of a detail of the system illustrated in FIGS. 1–4.

The cart(s) 22 is (are) locked in place relative to hopper 20 by inserting tongues 76 with which cart(s) 22 is (are) provided into eyes 78 provided for the tongues 76 on the legs 80 of hopper 20. FIGS. 1, 2, and 4. Quick release locking pins 82 are inserted through aligned passageways in tongues 76 and eyes 78 to fix the position(s) of the cart(s) 22 relative to the hopper 20.

Figure 6:
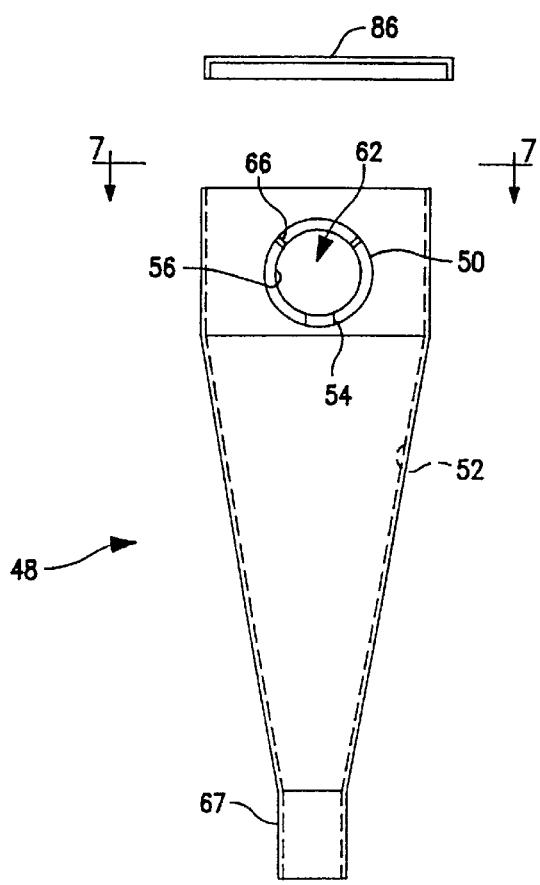
FIG. 6 illustrates an end elevational view of the detail illustrated in FIG. 5, taken generally along section lines 6—6 of FIG. 5, shown with the lid for the detail of FIGS. 5–7.
Figure 7:
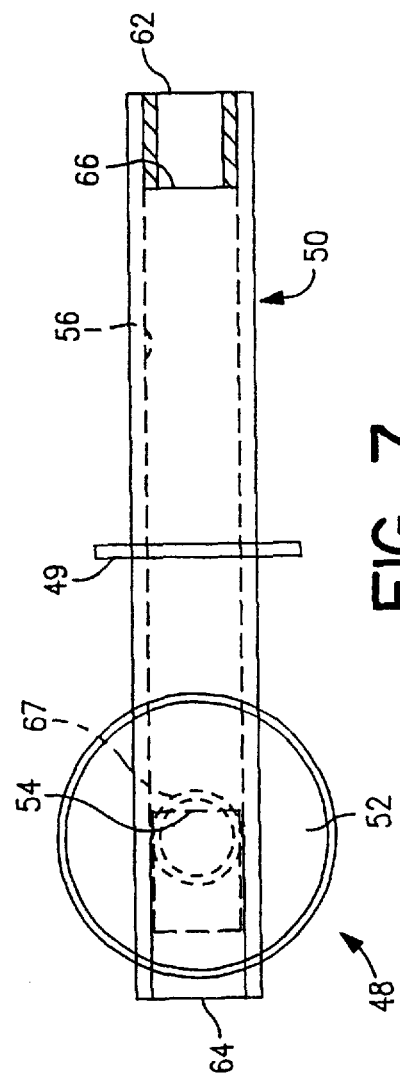
FIG. 7 illustrates a top plan view of the detail illustrated in FIGS. 5–6 taken generally along section lines 7—7 of FIGS. 5–6.

The motor(s) 74 are coupled to their respective conveyors 58 by universal joints 72 which can be any of the known types. Universal joints 72 are selectively coupled at one end to respective motor 74 output shafts and at the other end to shafts 70 of respective augers 59 by, for example, cotter pins. The second portions 52 of housing 48 are individually closed by separate lids 86 (FIG. 6). To provide additional protection against contamination of the powder in second portion 52, covers 88 (FIGS. 1 and 2) are hinged 90 along both of the longer walls 44 of hopper 20 at a suitable height so that when the covers are pivoted upward, access can be had to second portions 52, shafts 70 and universal joints 72. When covers 88 are pivoted downward, second portions 52, shafts 70 and universal joints 72 are covered. Locks 92 (FIGS. 2 and 4) are pivoted to the end walls 94 of hopper 20 to facilitate retaining covers 88 in their upward pivoted orientation, for example, for coupling/uncoupling of motors 74 to/from respective shafts 70, such as during a color change in which a hopper 20 for fluidizing one color of powder is replaced by a hopper 20 for fluidizing another color of powder.

Figure 9:
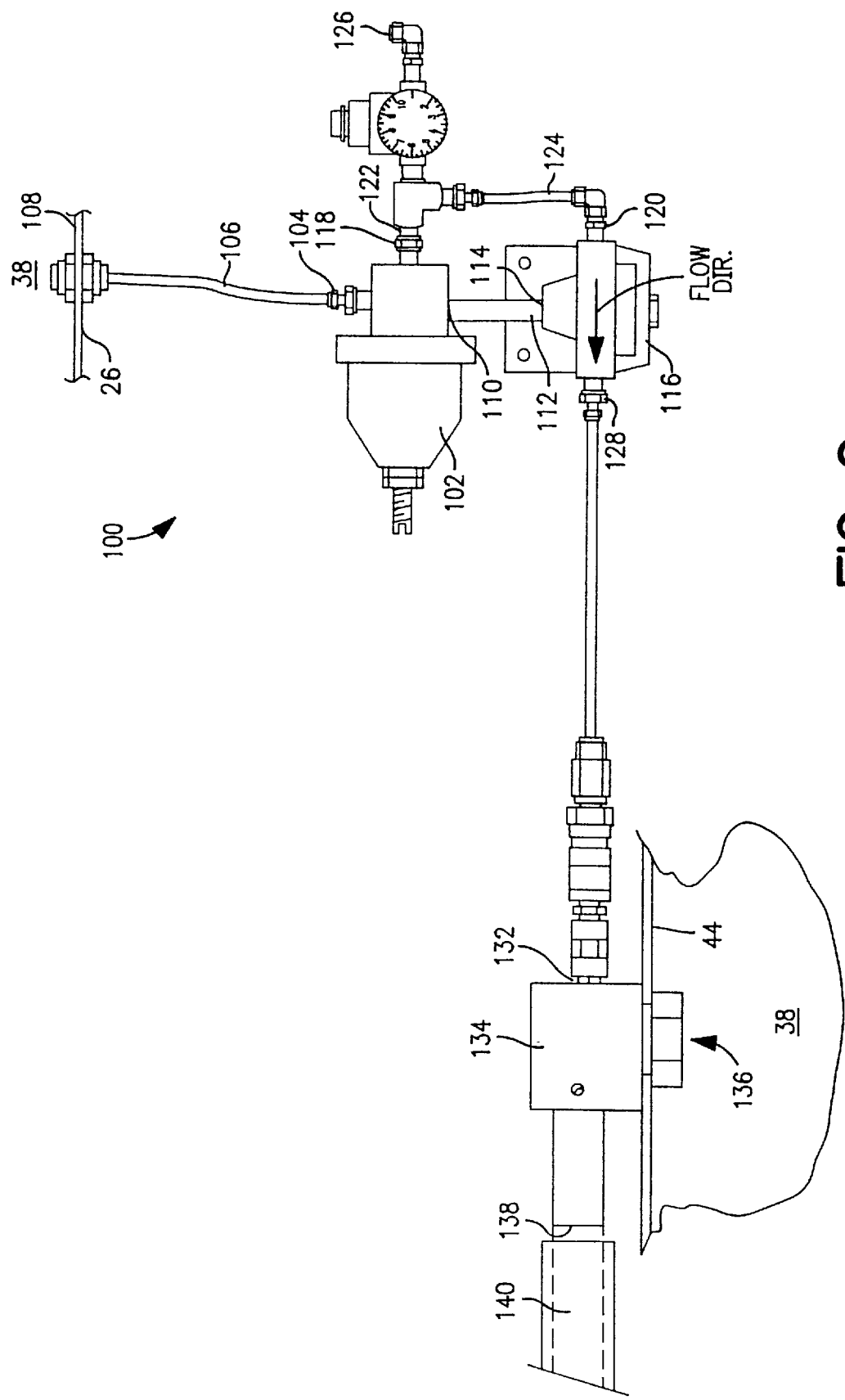

Referring now particularly to FIGS. 1 and 9, a hopper 20 air regulator relay assembly 100 includes a precision air relay 102 having an air pressure signal input port 104 connected by a conduit 106 and fitting 108 to the lid 26 of the hopper 20. Relay 102 is, for example, a Model 67-100 relay available from Moore Products Company, Springhouse, Pa. 19477. The air pressure signal (actually, this signal commonly is a slight vacuum because of the action of the apparatus of FIG. 9) from right beneath lid 26 is thus supplied to the input port 104 of relay 102. The output port 110 of relay 102 is coupled by a conduit 112 to an input port 114 of an amplifying air relay valve 116 such as, for example, a Model 66BA6 amplifying air relay valve, also available from Moore Products Company. Supply ports 118, 120 of relay 102 and valve 116, respectively, are coupled through conduits 122, 124, respectively, to, for example, factory compressed air 126. The output port 128 of valve 116 supplies air flow to a control input 132 of a venturi pump transfer assembly 134. Transfer assembly 134 illustratively is a part number 103124 available from GEMA Industrial Powder Systems Division of ITW. Transfer assembly 134 is mounted on one of walls 44 of hopper 20 directly beneath lid 26. A controlled input port 136 of transfer assembly 134 withdraws fluidized powder from right beneath lid 26 under the control of air flow through port 132 and exhausts it through an output port 138 and a hose 140 connected to port 138 to a powder reclaim system (not shown) of any suitable configuration. Closed loop feedback of the condition, that is pressure/vacuum, directly underneath lid 26 is thus obtained. In this way, the condition to which the conveyors 58 are exposed inside gallery 38 is maintained substantially constant, reducing substantially the variability in the delivery rates of powder by the various conveyors 58.

What is claimed is:

1. Apparatus for fluidizing a pulverulent material in a stream of fluidizing gas, the apparatus comprising a membrane through which a fluidizing gas can flow but a pulverulent material to be fluidized cannot, first means defining on a first side of the membrane a first fluidizing gas gallery, second means defining on a second side of the membrane a second fluidized pulverulent material gallery, third means providing a passageway out of the second gallery for the removal of fluidized pulverulent material from the second gallery, the third means comprising a housing having a first housing portion extending into the second gallery, the first housing portion having a first side region facing the semipermeable membrane and a second side region facing away from the semipermeable membrane, the second side region provided with an inlet opening for fluidized pulverulent material, a first conveyor in the housing, the first conveyor having multiple conveying sections, at least a first of the multiple conveying sections located adjacent the inlet opening, the first conveying section being generally coextensive with the inlet opening, the housing further having a second housing portion for collecting pulverulent material conveyed from the second gallery by actuation of the first conveyor, and a second conveyor communicating with the second housing portion for conveying the pulverulent material conveyed thereto to a pulverulent material utilization device.

2. The apparatus of claim 1 further comprising means for generating a signal indicative of fluidizing gas pressure inside the second gallery and controlling fluidizing gas pressure in the second gallery in response to the signal.

3. The apparatus of claim 2 wherein the means for generating a signal indicative of fluidizing gas pressure inside the second gallery and for controlling fluidizing gas pressure in the second gallery in response to the signal comprises a valve having a controlling input and a controlled output, fourth means for coupling the second gallery to the controlling input of the valve, and fifth means for coupling the controlled output to the second gallery to exhaust fluidized pulverulent material therefrom.

4. The apparatus of claim 3 wherein the fourth means comprises a relay having a controlling input and a controlled output, the second gallery being coupled to the controlling input of the relay, and the controlled output of the relay being coupled to the controlling input of the valve.

5. The apparatus of claim 4 wherein the fifth means comprises a venturi type transfer pump having a controlling input, a controlled input and an output, the controlling input of the transfer pump being coupled to the controlled output of the valve, the controlled input of the transfer pump being coupled to the second gallery, and the controlled output of the transfer pump providing a reclaimable fluidized pulverulent material flow.

6. The apparatus of claim 1 wherein the first housing portion comprises a generally right circular cylindrical interior, the first conveyor comprising an auger, the conveying sections of the first conveyor comprising flights along the length of the auger, the first conveying section comprising the first flight adjacent the inlet opening.

7. The apparatus of claim 2 wherein the first housing portion comprises a generally right circular cylindrical interior, the first conveyor comprising an auger, the conveying sections of the first conveyor comprising flights along the length of the auger, the first conveying section comprising the first flight adjacent the inlet opening.

8. The apparatus of claim 3 wherein the first housing portion comprises a generally right circular cylindrical interior, the first conveyor comprising an auger, the conveying sections of the first conveyor comprising flights along the length of the auger, the first conveying section comprising the first flight adjacent the inlet opening.

9. The apparatus of claim 4 wherein the first housing portion comprises a generally right circular cylindrical interior, the first conveyor comprising an auger, the conveying sections of the first conveyor comprising flights along the length of the auger, the first conveying section comprising the first flight adjacent the inlet opening.

10. The apparatus of claim 5 wherein the first housing portion comprises a generally right circular cylindrical interior, the first conveyor comprising an auger, the conveying sections of the first conveyor comprising flights along the length of the auger, the first conveying section comprising the first flight adjacent the inlet opening.

* * * * *